July 8, 1969  D. R. LONG  3,454,296
SAFETY DEVICE FOR HANDLING HOT ELECTRICAL TRANSMISSION LINES
Filed July 13, 1967

INVENTOR
DOUGLAS R. LONG
BY
*John H. A. Earley*
ATTORNEY

United States Patent Office
3,454,296
Patented July 8, 1969

3,454,296
SAFETY DEVICE FOR HANDLING HOT
ELECTRICAL TRANSMISSION LINES
Douglas R. Long, Bordentown, N.J., assignor to Del-Guy Inc., Buckley, Wash., a corporation of Washington
Filed July 13, 1967, Ser. No. 653,172
Int. Cl. B66c 1/44; F16g 11/10
U.S. Cl. 294—78                                                             6 Claims

ABSTRACT OF THE DISCLOSURE

A safety device for handling hot electrical transmission lines and the like comprising a holding member having a slot formed therein, flange means for fastening the holding member to a rope which is adapted to be attached between the top of a utility pole and the ground, and a locking member which is pivotally connected to the holding member and includes a hook element, whereby the slot is adapted to receive a hot electrical transmission line and the hook element of the locking member is adapted to close the open end of the slot to retain the line.

Background of the invention

The cross arms of utility poles that support electrical transmission lines and telephone lines require replacement from time to time as they wear out. Such replacement requires that a lineman remove the line from the old cross arm, support the hot lines in some manner, remove the old cross arm, affix a new cross arm to the pole, and mount the hot lines onto the new cross arm. To support the lines during the replacement procedure, the lineman presently ties a rope to each line and fastens it to the top of the pole and to the ground. This is a hazardous undertaking because the lines are carrying electricity and a lineman has to physically touch the hot wires, and this is dangerous even though he is wearing gloves.

Summary of the invention

Accordingly, it is an object of this invention to provide a safety device which provides that the lineman does not have to touch the hot lines when replacing a cross arm on a utility pole.

It is another object to provide a safety device for temporarily supporting a hot line without touching it.

It is another object to provide means whereby a number of lines may be supported from one rope attached between the top of a utility pole and the ground.

The objects of the invention are accomplished by providing a safety device which is adapted to be supported on a rope extending from the top of the utility pole to the ground and which includes a holding member having a slot which receives the utility line, a locking member pivotally connected to the holding member and including a hook element for closing the slot and locking the utility line in place, and flange means through which the rope is trained for fastening the safety device to the rope.

Brief description of the drawing

FIG. 1 is a view in front elevation of a safety device constructed in accordance with the invention for handling hot electrical transmission lines and the like;

Description of the preferred embodiments

Figure 1:
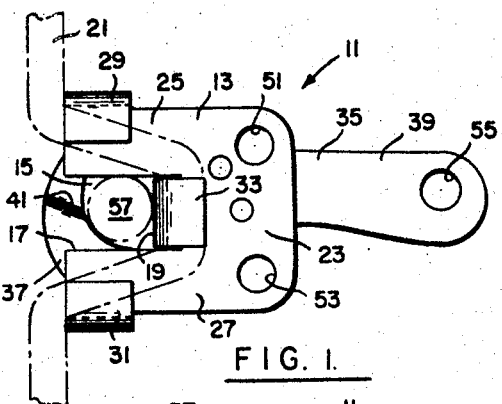
Figure 2:
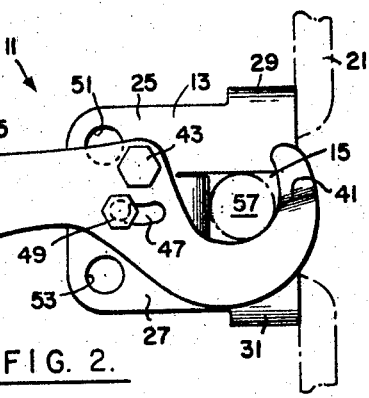
FIG. 2 is a view in rear elevation of the safety device of FIG. 1.
Figure 3:
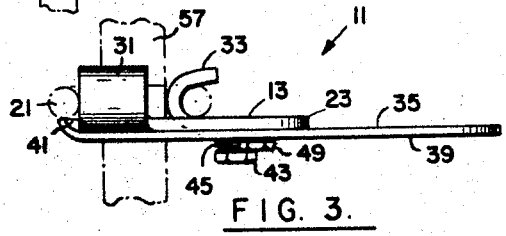
FIG. 3 is a view in bottom plan of the safety device of FIG. 1.
Figure 4:
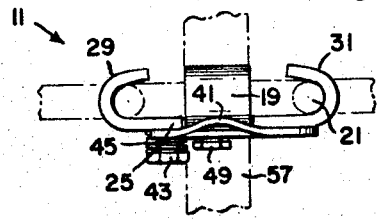
FIG. 4 is a view looking from the left of FIG. 3.
Figure 5:
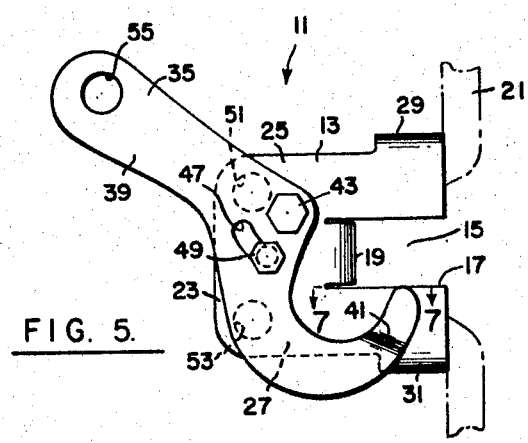
FIG. 5 is a view in rear elevation similar to FIG. 2 except that the hook of the holding member is shown in open position whereas it is shown closed in FIG. 2.
Figure 7:
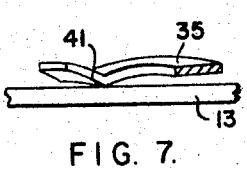
FIG. 7 is a partial view in section taken as indicated by the lines and arrows 7—7 which appear in FIG. 5.

Turning now to the specific embodiments of the invention selected for illustration in the drawings, there is shown a safety device 11 for handling hot electrical transmission lines, whether they be power lines or telephone lines, which comprises a holding member 13 that may be made of brass and has a slot 15 formed therein with an open end 17 and a base end 19.

Flange means extends from holding member 13 for fastening the holding member 13 to a rope 21 which is adapted to be attached between the top of a utility pole and the ground. Holding member 13 includes a cross portion 23 that has upper leg 25 and lower leg 27 extending therefrom which define the slot 15. The flange means includes a curved flange 29 extending downwardly from upper leg 25, a curved flange 31 extending upwardly from lower leg 27, and a curved flange 33 extending from base end 19 of slot 15.

A locking member 35 is pivotally connected to holding member 13 and includes a hook element 37 and a handle portion 39. Hook element 37 includes a curved portion 41 for frictionally engaging holding member 13 to hold the hook element in open position when desired.

A pivot bolt 43 connects locking member 35 to holding member 13, and a spring 45 is connected between pivot bolt 43 and locking member 35 for urging the locking member to closed position. When the locking member is in open position, the curved portion 41 of hook element 37 holds the hook element open against the urging of spring 45.

Locking member 35 has a curved slot 47 formed therein with a stop bolt 49 positoned in slot 47 and mounted in holding member 13 for limiting the travel of the locking member.

Holding member 13 is provided with convenience holes 51 and 53, and handle portion 39 of locking member 35 is provided with a convenience hole 55 that are adapted to receive snap fasteners attached to a rope pulley which is used to lift materials to a lineman on the top of a pole.

In operation, a number of safety devices 11 are fastened to a single rope 21 which is secured to the top of a utility pole and to the ground. The lineman at the top of the utility pole reaches out with his hot stick to bump open locking member 35. Friction between curved portion 41 of hook element 37 and holding member 13 holds the locking member 35 in open position against the urging of spring 45. Then he bumps a utility line 57 into the wire receptacle or slot 15 in holding member 13, and bumps the locking member 35 closed with his hot stick. By following this procedure with each line, the lineman temporarily supports the hot lines without touching them, and the lines, which had been snubbed to the insulators on the cross arm, are released therefrom by cutting the snubber, and the old cross arm is removed and replaced by a new one.

Figure 8:
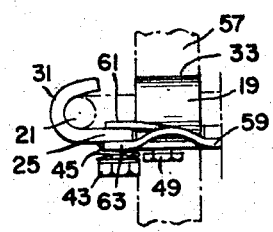
FIG. 8 is a view similar to FIG. 4 of another embodiment of the invention.
Figure 6:
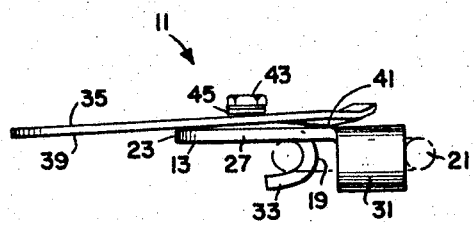
FIG. 6 is a view in bottom elevation of the safety device shown in FIG. 5.

Locking member 35 prevents the lines from bouncing out of the safety device if the line snaps up and down from tension. FIG. 8 shows an embodiment of the invention that includes a bifurcated hook element 59 having hook arms 61 and 63 that close on each side of leg 25 so as to prevet any possibility of the hook element separating from leg 25 due to tension or vibration and the line 57 from slipping out between them.

The lineman then snubs the lines to the insulators mounted on the new cross arm, and bumps locking members 35 open with his hot stick, and bumps the lines out of slots 15. In other words, to release the lines 57 from the safety devices 11, the lineman reverses the procedure of capturing and supporting the lines.

Stop bolt 49 limits the travel of locking member 35 in open and closed position.

Curved locking flanges 29, 31, and 33 are so positioned that the rope 21 does not slip, just a small amount of tension in rope 21 holding the safety device 11 securely therein. The locking flanges also help prevent the safety device 21 from twisting about an axis parallel to rope 21.

I claim:

1. A safety device for handling hot electrical transmission lines and the like, comprising a holding member having a slot formed therein with an open end and a base end, flange means extending from the holding member for fastening the holding member to a rope which is adapted to be attached between the top of a utility pole and the ground, a locking member pivotally connected to the holding member and including a hook element and a handle portion, and friction means for holding the hook element in open and closed positions, whereby said slot is adapted to receive a hot electrical transmission line and the hook element of the locking member is adapted to close the open end of the slot to retain the line.

2. The safety device of claim 1, wherein the holding member includes a cross portion with upper and lower legs extending therefrom defining said slot, and said flange means includes a curved flange extending downwardly from the upper leg, a curved flange extending upwardly from the lower leg, and a curved flange extending from the base end of the slot.

3. The safety device of claim 1, wherein a pivot bolt connects the locking member to the holding member, and a spring is connected between the pivot bolt and the locking member for urging the locking member against the holding member, whereby in open position the spring presses the locking member against the holding member to frictionally hold the locking member open.

4. The safety device of claim 1, wherein the locking member has a curved slot formed therein with a stop bolt positioned therein and mounted in the holding member for limiting the travel of the locking member.

5. The safety device of claim 1, wherein the hook element is bifurcated and has a pair of hook arms extending therefrom adapted to close on each side of the holding member.

6. A safety device for handling hot electrical transmission lines and the like, comprising a holding member having a slot formed therein with an open end and a base end, flange means extending from the holding member for fastening the holding member to a rope which is adapted to be attached between the top of a utility pole and the ground, and a locking member pivotally connected to the holding member and including a hook element and a handle portion, said hook element including a curved portion for frictionally engaging the holding member to hold the hook element in open position against the urging of a spring whereby said slot is adapted to receive a hot electrical transmission line and the hook element of the locking member is adapted to close the open end of the slot to retain the line.

References Cited

UNITED STATES PATENTS

| 1,344,187 | 6/1920 | Oliver | 294—83 |
| 1,429,161 | 9/1922 | Newlin | 294—83 |
| 2,537,607 | 1/1951 | Stone | 294—104 X |
| 3,336,005 | 8/1967 | Dickerman | 294—83 X |

FOREIGN PATENTS 597,133   8/1959   Italy.

EVON C. BLUNK, *Primary Examiner.*

HARVEY C. HORNSBY, *Assistant Examiner.*

U.S. Cl. X.R.

24—123, 132; 294—83, 104